Nov. 28, 1967  J. V. GRAHAM ET AL  3,354,832
WELL PUMP
Filed March 4, 1966  2 Sheets-Sheet 2
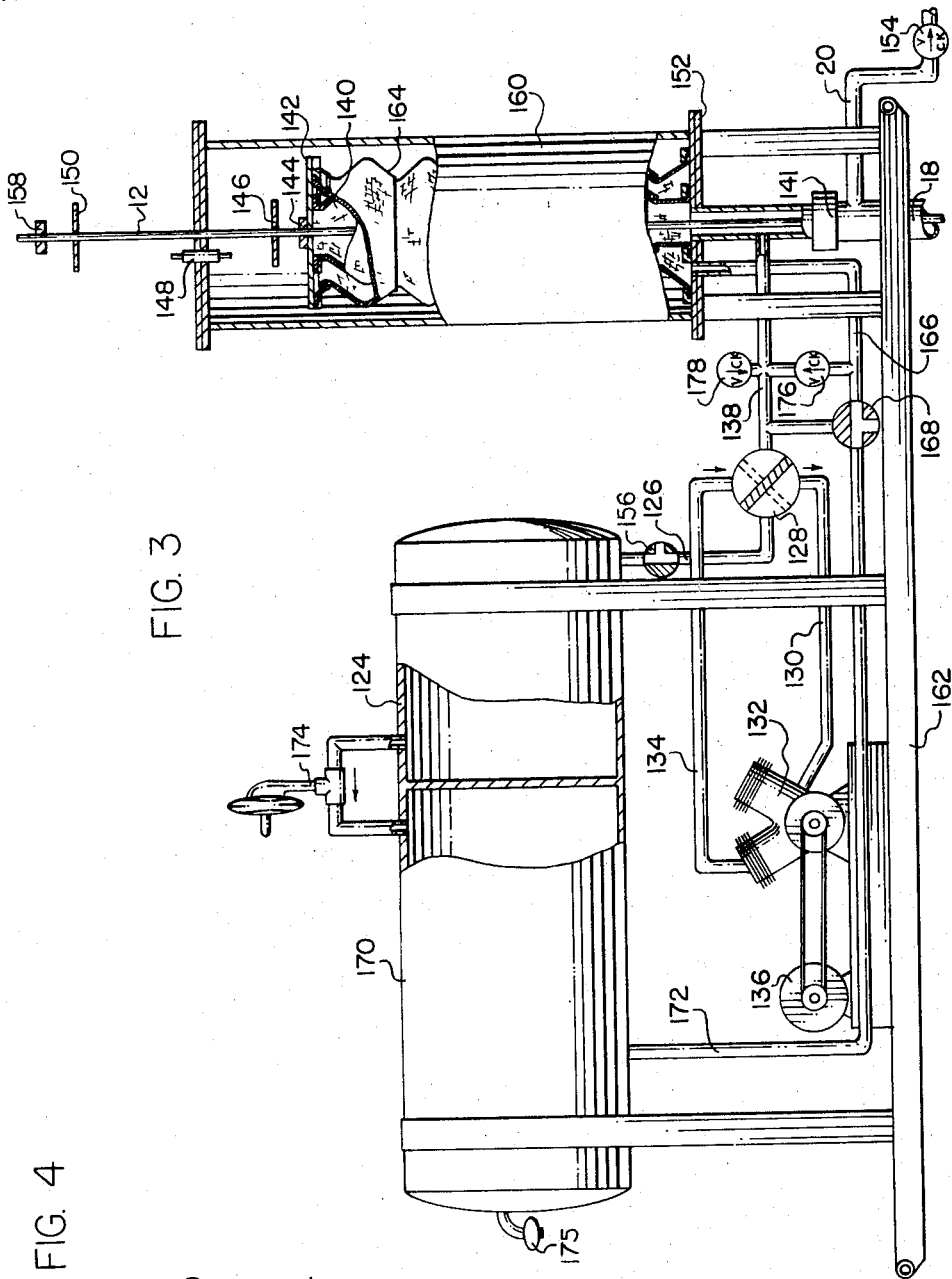
FIG. 3
FIG. 4
INVENTORS
JOHN V. GRAHAM
JOHN B. KEELING
LEONARD L. ROBINETT
BY 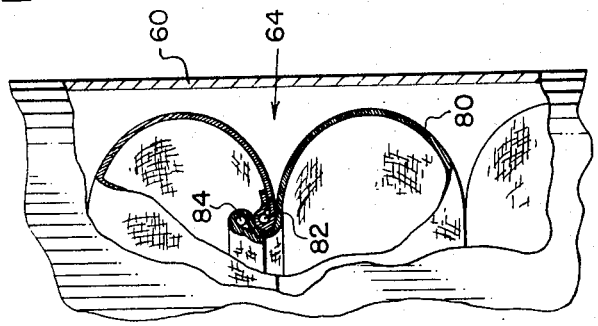

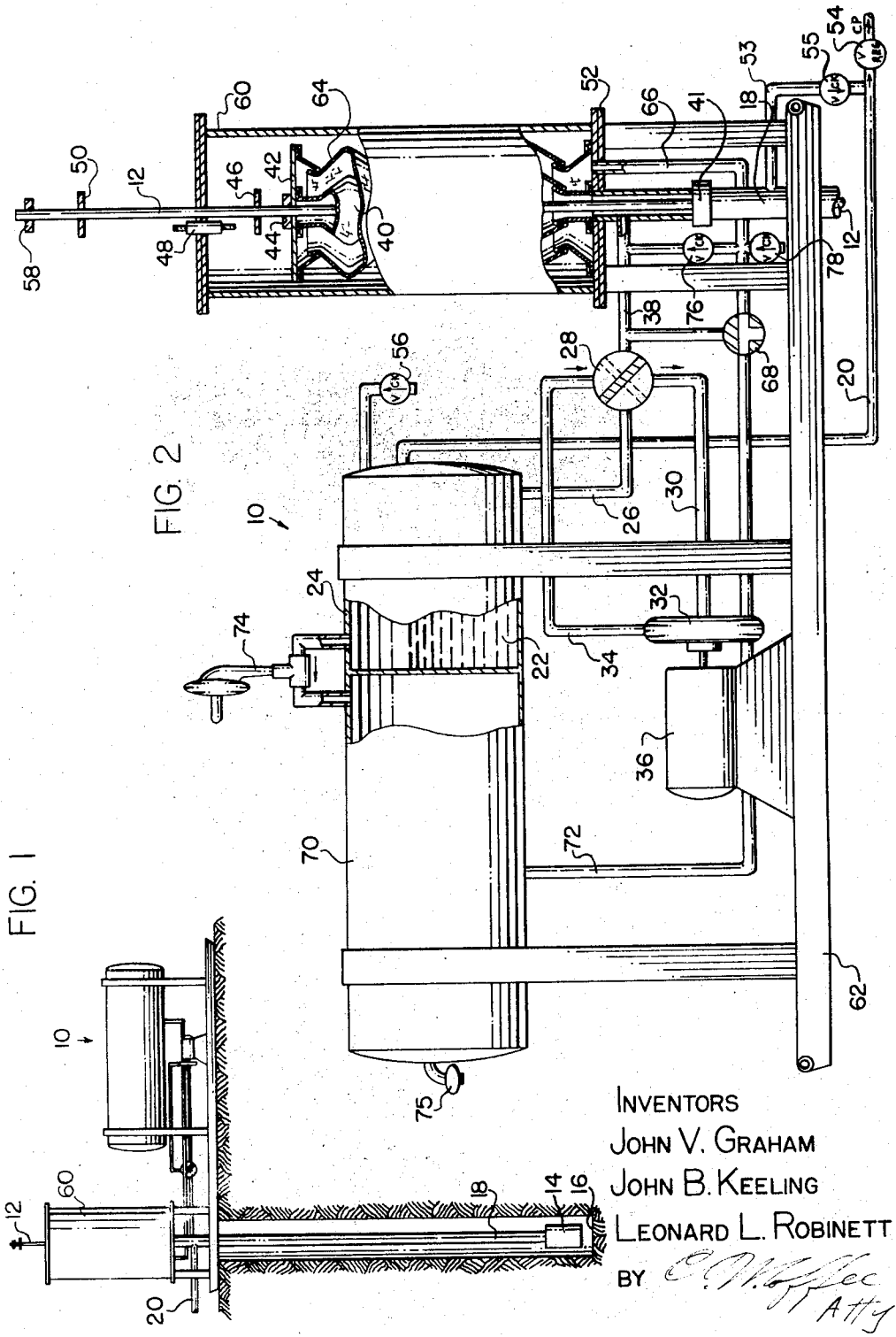

United States Patent Office 3,354,832
Patented Nov. 28, 1967

3,354,832
WELL PUMP
John V. Graham, John B. Keeling, and Leonard L. Robinett, all of 918 W. Monroe, Lovington, N. Mex. 88260
Filed Mar. 4, 1966, Ser. No. 531,901
14 Claims. (Cl. 103—46)

ABSTRACT OF THE DISCLOSURE

A fluid pumping system for oil wells uses a bellows directly connected to the sucker rod. The bellows is of a special construction having elements which snap together to form the composite structure. Two concentric bellows are used, the outside bellows working in connection with a pressurized surge tank which, during operation, has no fluid added or removed therefrom. This is a counterbalance bellows which offsets the weight of the sucker rod. The inside bellows has fluid pumped to and from it to activate the sucker rod. Check valves insure that the pressure in each bellows is always greater than the pressure outside the bellows.

In one embodiment, compressed air is used as a fluid within the bellows. In the other embodiment, the oil pumped from the well is used as fluid inside the bellows, and the oil within the system is a portion of the operating cycle.

---

This invention relates to oil wells and, more particularly, to a pumping unit for reciprocating the sucker rod in an oil well.

According to this invention, the sucker rod of an oil well is reciprocated by attaching the sucker rod to an expandable motor, such as a bellows, and expanding and contracting the motor by a valve connecting it to a source of pressurized fluid. This invention has the following advantages:

(A) The weight of the unit is greatly reduced from that of conventional units. Much less expensive materials are required.

(B) Much less precision machine work is required.

(C) The unit has no gear box and fewer bearings and no bearings which are under extreme stress.

(D) The unit can be operated on compressed air or residue gas from a gasoline plant, as well as upon the fluids produced from the well to which it is attached.

(E) The unit is fully counterbalanced. Also, it automatically adjusts itself to be counterbalanced correctly.

(F) The unit requires little or no lubrication.

(G) The speed may be adjusted over a wide range without necessity of changing sheaves or motors.

(H) The length of the stroke may be adjusted over a wide range of values. Also, the working portions of the polish rod may be readily adjustable to different portions of the polish rod.

(I) It has no exposed moving parts; therefore, it is safer both for humans and livestock and no extra guards or fencing is required.

(J) The unit has far fewer moving parts and, therefore, less maintenance is required.

(K) The unit has a longer stroke and therefore a slower stroke for the same capacity, resulting in less strain upon sucker rods and associated equipment.

(L) The unit, being extremely light in weight and compact in size, may be transported without dismantling.

(M) It is automatically compensating for different loads.

(N) The unit cannot be overloaded.

(O) The stuffing box is in a protected position with a reduced differential pressure across it so that the leaks are largely eliminated.

(P) The stuffing box and packing lasts longer because: (a) there is better alignment between the unit and the stuffing box; (b) the stuffing box is protected from dust and abrasives; (c) there is reduced pressure differential across the stuffing box, making it unnecessary to tighten the stuffing box with as much stress as previously required.

(Q) The alignment problems are largely eliminated and, therefore, the installation is quicker and easier.

(R) The unit has better efficiency.

(S) The unit is readily adaptable for utilizing the hydraulic power which is available in a water-flooded field.

(T) The unit is protected from damage in the event the pump sticks and there would not be the possibility of self-destruction.

An object of this invention is to provide a means for reciprocating the sucker rod of an oil well having the above advantages.

Another object is to provide a novel bellows.

Further objects are to achieve the above with a device that is sturdy, compact, durable, simple, versatile, safe, and reliable, yet inexpensive and easy to manufacture, install and operate.

The specific nature of the invention, as well as other objects, uses, and advantages thereof, will clearly appear from the following description and from the accompanying drawing, the different views of which are not necessarily to the same scale, in which:

FIG. 1 is a schematic representation of the oil well with the unit shown in block form for purpose of illustrating the entire environment of the unit.

FIG. 2 is a schematic representation of an embodiment of this invention utilizing hydraulic pressure.

FIG. 3 is a schematic representation of a unit according to this invention utilizing pneumatic pressure.

FIG. 4 is a detail view showing the bellows construction.

Referring now to the drawing, and particularly to FIG. 1 which represents oil well 16 on which unit 10 according to this invention is installed, the unit 10 reciprocates sucker rod 12 which operates pump 14 far beneath the surface of the earth within oil well 16. The sucker rod causes the pump 14 to pump the oil from the well through tubing 18 to the surface of the ground and out of flow pipe 20.

One embodiment of the invention, illustrated in FIG. 2, is designed to operate upon liquid 22 contained within reservoir 24. The liquid is pumped through bottom pipe 26, through one side of four-way valve 28, and through pump intake 30 and pump 32 into the pump outlet 34. The pump 32 is operated by electric motor 36. The outlet 34 of the pump is connected through the other side of four-way valve into bellows intake pipe 38 and thus into the first or inside or power bellows 40.

The connections described above with the four-way valve 28 in the position shown will cause the bellows 40 to expand and thus raise the sucker rod 12 inasmuch as the sucker rod rests upon top plate 42 of the bellows by a conventional polish rod clamp 44 (shown schematically). The sucker rod continues upon its upward stroke until power stroke stop 46 on the sucker rod 12 contacts reversing mechanism 48. When the stop 46 strikes the reversing mechanism (not shown in detail because of its conventional and well-known character), the four-way valve 28 is caused to reverse to the dotted line position. Therefore, it may be seen that, with no other change and the continued operation of the pump 32 by the motor 36, fluid is now pumped from the bellows 40, from the bellows intake line 38 to the pump intake 30, through the pump and the pump outlet 34, again through the four-way valve 28, and back through the bottom pipe 26 into the bottom of the reservoir 24. Upon liquid being pumped from the power bellows 40, the sucker rod 12 will be lowered again into the tubing 18 until the downstroke stop 50 on the sucker rod 12 again contacts the reversing mechanism 48 to again reverse the operation.

Stuffing box 41 between the tubing 18 and bottom plate 52 of the bellows 40 is for inspection, testing, and maintenance only. In normal operation, the fluid on each side of the stuffing box is the same and the pressure is the same because the packing is loosened. The bottom plate 52 is fluidly sealed to the top of an extension of the tubing 18. The liquid within the power bellows 40 is the liquid being pumped from the well. The area of the power bellows 40 is greater than the area of the pump 14 and, therefore, increased pressure within the power bellows 40 and tubing 18 will cause the sucker rod 12 to rise. Also, analysis will show that less fluid will be pumped into the bellows 40 on the up or power stroke than is taken from the bellows and tubing 18 on the downstroke; therefore, at the end of each stroke, more fluid is pumped into the reservoir 24. Therefore, in this embodiment, the flow line 20 is connected to the reservoir 24 at a level sufficient to always ensure an adequate amount of working liquid 22 within the reservoir 24. Back pressure valve 54 is located in the flow line 20 so that there is always a certain amount of pressure within reservoir 24. Secondary flow line 53 with check valve 55 is connected from the tubing 18 to flow line 20 upstream the back pressure valve 54 to provide a flow path from the tubing 18 to the reservoir 24.

Vacuum breaker, in the form of check valve 56, is connected near the top of reservoir 24 to ensure that the pressure within the reservoir 24 is always at least as much as atmospheric pressure.

Inasmuch as the flow line 20 is not connected to the top of the reservoir 24, there will always be a certain gas cushion above the top of the liquid within the reservoir providing cushion to the operation. Also, of course, if this gas cushion is reduced, analysis will show that peak pressures will increase, resulting in larger flow of liquid through the constant pressure valve 54, therefore increasing the amount of cushion. Also, it will be understood by those skilled in the art that nearly all oil wells produce a liquid with a great deal of gas entrained within it and that, as it reaches the surface of the earth wherein the pressure is reduced, it will liberate gas so that the fluid produced by the well will have a great deal of gas in it. The fluid which flows through the flow line 20 will include gas as well as liquid.

It will be understood by those skilled in the art that a polish rod is attached to the top of the sucker rod 12; however, details of this have not been shown due to its conventional character. The combination of the polish rod and sucker rod are referred to herein as the sucker rod 12. Polish rod clamp 58 is schematically represented at the top of the sucker rod 12. Furthermore, a dust cover, in the form of a cylindrical can 60, is placed over the bellows unit to protect the same from dust, moisture, etc.; however, it would be vented to the atmosphere. Other than protecting the bellows unit from dust and moisture, it serves no other purpose than to support the reversing mechanism 48. Also, it will be understood that there is a fluid-tight seal between the polish rod clamp 44 and the top plate 42 of the bellows. However, there is no movement between the polish rod and the top plate 42 and therefore a good permanent fluid-tight seal is easily achieved, Particularly, it is easily achieved as compared with the stuffing boxes generally found between the sucker rod 12 and the tubing 18. Also, it will be noted that this seal 44 is the only seal sealing the tubing 18 and the sucker rod 12, so that the problem of maintaining the fluid seal within the tubing 18 is extremely reduced.

The bottom plate 52, as well as the pump 32, the motor 36, and the reservoir 24, are shown supported upon skids 62. This provides an easy and convenient means for transporting the unit from one location to another. It will be appreciated by those skilled in the art that the unit is extremely light in weight and that the alignment of the unit over the tubing 18 is easily accomplished. Furthermore, it will be noted that pump 32 has definite pressure limitations and the system has little inertia. Therefore, if pump 14 becomes stuck or something, there is little likelihood of damage to the rods, etc., such as occurs when a unit with large inertia becomes stuck and the inertia continues the operation of the system to the damage of the various parts.

Under ordinary operating conditions, the dead weight of the sucker rod 12 or the weight of the sucker rod resulting from its own weight, as opposed to the dynamic weight or the force required to pump the oil, is counterbalanced by air within second or outer or counterbalance bellows 64. The counterbalance bellows 64 surround the power bellows 40 and also extend from the bottom plate 52 to the top plate 42. There is a fluid opening in the bottom of the counterbalance bellows 64 which is connected to bellows intake line 66, through the extra power valve 68 to air container 70, through air pipe 72. The pressure within the air container is sufficient to counterbalance the dead weight of the sucker rod. It is maintained at the desired level by constant pressure valve 74. If the pressure in container 70 falls below the set minimum value, the valve 74 permits gas to flow from reservoir 24 into container 70, provided the pressure is higher in reservoir 24. The pressure normally will be higher in reservoir 24 inasmuch as check valve 76 in general always maintains the pressure in container 70 to no more than the pressure in reservoir 24. There is a build up in pressure in reservoir 24 at least periodically with every stroke due to the pump action of the rise and fall of the liquid 22. This will alternately suck air in through vacuum breaker 56 and compress it. Of course, normally there will be gas pressure within the reservoir 24 from gas produced from the well.

The check valve 76 acts to ensure that at all times the pressure within the power bellows 40 is as great as the pressure within the counterbalance bellows 64. Stated otherwise, the check valve 76 is means for ensuring that the pressure within the bellows 40 is at least as great as the pressure in the space surrounding the bellows. Likewise, check valve 78 is means for ensuring that the pressure within the counterbalance bellows 64 is as great as the pressure in the space surrounding the counterbalance bellows.

If a situation arises where it is desired that more power and more force be provided upon the sucker rod 12, which is normally produced by the pump 32, it is possible to obtain same by changing valve 68 so that the bellows intake line 66 is connected to the bellows intake line 38. Also, the bellows intake line 66 is then not connected to any other place. Therefore, of course, both the bellows 64 and the bellows 40 operate as power bellows, greatly increasing the power upon the sucker rod 12.

The control of valve 68 could be manual, but we prefer to automatically control it by pressure or time. If the valve 28 is not reversed within a predetermined time, or if the pressure in the intake line 38 exceeds a predetermined amount, the valve 68 would be moved to the extra power position. Analysis will show that operation of the extra power valve 68 will automatically adjust the counterbalancing of the well to the correct value.

Pressure relief valve 75 prevents excessive pressures within air container 70.

Now referring to FIG. 3, it may be seen illustrated a unit embodying this invention which is pneumatically operated. It will be understood to be basically similar to the embodiment shown in FIG. 2 in that it likewise has a power bellows 140 which reciprocates the sucker rod 12 to pump oil through the tubing 18 into the flow line 20. However, this system operates upon air or other gases contained within reservoir 124 which flows through bottom pipe 126 and four-way valve 128, through compressor intake 130, through the compressor 132, into compressor outlet 134. The compressor is driven by electric motor 136. The compressor outlet line 134 is connected to bellows intake line 138 by the four-way valve 128 in the position shown. Stuffing box 141 is between the bottom plate 152 of the power bellows 140 and the tubing 18 with its flow line 20. Check valve 154 is provided in the flow line as is standard practice. As before, the bottom plate 152 is fluidly sealed to a sleeve extension on top of stuffing box 141 which is on the top of the tubing 18. The differential pressure upon the stuffing box 141 is minimized so that leakage problems are minimized. Also, of course, the stuffing box 141 is protected from grit and abrasives. The sucker rod rests upon the top plate 142 through the use of the polish rod clamp 144 again shown schematically. Power stroke stop 146 is adjustably attached to the sucker rod 12, as before, to interact with reversing mechanism 148, as before. Likewise, the downstroke stop 150 functions as in the previous embodiment. The bellows are covered with a dust cover 160 which is vented to the atmosphere. Also, the entire unit is mounted upon skids 162.

Counterbalance bellows 164 surround the power bellows 140 and are connected by bellows intake 166 through extra power valve 168 to air container 170 through air pipe 172. The pressure within the air tank 170 is maintained by pressure valve 174. Also, check valves 176 and 178 function, as before, to ensure that the pressures within the bellows are greater than in the space surrounding them. Relief valve 175 prevents over-pressuring the air tank 170.

Three-way valve 156 in bottom line 126 is opened automatically to atmosphere if the pressure in this line is reduced below a pre-set minimum. When the valve is opened to atmosphere, additional air is added to the system.

The pneumatic unit illustrated in FIG. 3 has the advantage that it is generally lighter weight than the liquid unit illustrated in FIG. 2.

A specially designed bellows is advantageous for this particular usage. Referring to FIG. 4 and also referring to bellows 64 as typical (although it will be understood that the bellows 140 and 164 are of similar construction), it may be seen that the bellows are constructed of a series of bellows rings 80. The bellows rings are constructed of fabric which is impervious to the fluid in which they operate. Specifically, nylon impregnated with polyurathane has been satisfactory, although there are many other satisfactory materials. Each of the rings 80 is keg-shaped by which we mean that it has a greater diameter in the middle than it does on either end. Each ring 80 has a metal circular hoop 82 at the bottom and a metal circular hoop 84 of approximately the same diameter at the top. These metal hoops are attached to the top and bottom of the rings 80 to be fluid tight. The hoops are approximately the same diameter so that a complete bellows may be assembled from a series of bellows rings 80 snapped together. As illustrated, the top of one bellows with its hoop 84 is telescoped within the bottom of the adjacent ring 80. The bottom hoop 82 is telescoped around the top of the ring 80. The pressure within the bellows will press the pliable fabric against the bottom ring 82 to form a fluid-tight seal. This seal is also maintained by the interaction of the rings 82 and 84. It will be remembered that precautions have been taken to ensure that, at all times, the pressure within the bellows is greater than the pressure of the space surrounding the bellows.

It will be apparent that the embodiments shown are only exemplary and that various modifications can be made in operation, construction, materials, and arrangement within the scope of the invention as defined in the appended claims.

Those skilled in the art will understand that various other valves, etc., will be installed for safety and convenience in testing, inspecting, and maintaining the unit and, further, that skilled craftsmen will understand the construction and operation of the various automatic elements described.

We claim as our invention:
1. In an oil well having:
   (a) a pump far beneath the earth,
   (b) a tubing extending from the pump to the surface of the earth, and
   (c) a sucker rod in the tubing attached to the pump, the reciprocation of the sucker rod operating the pump;
   (d) the improvement for reciprocating the sucker rod comprising in combination with the above:
   (e) a bellows having
      (i) a bottom plate,
      (ii) a top plate, and
      (iii) an impervious expandable member between the top plate and bottom plate,
   (f) the bottom plate fluidly sealed to the top of the tubing,
   (g) the sucker rod attached to the top plate,
   (h) a reservoir of fluid,
   (j) a means connected to said reservoir for pressurizing said fluid,
   (k) valve means interconnecting said means for pressurizing, reservoir, and bellows for flowing fluid under pressure into and out from said bellows responsive to the position of said sucker rod,
   (m) thus pumping said well,
said impervious expandable member including:
   (n) a series of bellows rings connecting the base plate and top plate,
   (o) each ring being an annular, pliable, imprevious fabric band with
   (p) a rigid circular hoop attached at top and bottom,
   (q) said hoops approximately the same diameter,
   (r) the bottom of each ring telescoped over the top of the next adjacent ring,
   (s) so that the top of the fabric is pressed by the internal pressure in the bellows against the bottom hoop to form a fluid tight seal.
2. In an oil well having:
   (a) a pump far beneath the earth,
   (b) a tubing extending from the pump to the surface of the earth, and
   (c) a sucker rod in the tubing attached to the pump, the reciprocation of the sucker rod operating the pump;
   (d) the improvement for reciprocating the sucker rod comprising in combination with the above:
   (e) a bellows having
      (i) a bottom plate,
      (ii) a top plate, and
      (iii) an impervious expandable member between the top plate and bottom plate,
   (f) the bottom plate fluidly sealed to the top of the tubing,
   (g) the sucker rod attached to the top plate,
   (h) a reservoir of fluid,
   (j) a means connected to said reservoir for pressurizing said fluid,
   (k) valve means interconnecting said means for pressurizing, reservoir, and bellows for flowing fluid under pressure into and out from said bellows responsive to the position of said sucker rod,
   (m) thus pumping said well,
   (n) the reservoir being fluidly connected with the tubing thus

(o) the fluid within the reservoir being the oil pumped from the well, and
(p) the means for pressurizing being a pump.

3. The invention as defined in claim 2 with the addition of
(q) a check valve connected from the space outside the bellows to the space inside the bellows to ensure that the pressure in the bellows is always as much as outside the bellows.

4. In an oil well having:
(a) a pump far beneath the earth,
(b) a tubing extending from the pump to the surface of the earth, and
(c) a sucker rod in the tubing attached to the pump, the reciprocation of the sucker rod operating the pump;
(d) the improvement for reciprocating the sucker rod comprising in combination with the above:
(e) a belows having
  (i) a bottom plate,
  (ii) a top plate, and
  (iii) an impervious expandable member between the top plate and bottom plate,
(f) the bottom plate fluidly sealed to the top of the tubing,
(g) the sucker rod attached to the top plate,
(h) a reservoir of fluid,
(j) a means connected to said reservoir for pressurizing said fluid,
(k) valve means interconnecting said means for pressurizing, reservoir, and bellows for flowing fluid under pressure into and out from said bellows responsive to the position of said sucker rod,
(m) thus pumping said well,
(n) the fluid within the reservoir being air and
(o) the means for pressurizing being an air compressor.

5. The invention as defined in claim 4 with the addition of
(p) a check valve connected from the space outside the bellows to the space inside the bellows to ensure that the pressure in the bellows is alyawys as much as outside the bellows.

6. In an oil well having:
(a) a pump far beneath the earth,
(b) a tubing extending from the pump to the surface of the earth, and
(c) a sucker rod in the tubing attached to the pump, the reciprocation of the sucker rod operating the pump;
(d) the improvement for reciprocating the sucker rod comprising in combination with the above:
(e) a bellows having
  (i) a bottom plate,
  (ii) a top plate, and
  (iii) an impervious expandable member between the top plate and bottom plate,
(f) the bottom plate fluidly sealed to the top of the tubing,
(g) the sucker rod attached to the top plate,
(h) a reservoir of fluid,
(j) a means connected to said reservoir for pressurizing said fluid,
(k) valve means interconnecting said means for pressurizing, reservoir, and bellows for flowing fluid under pressure into and out from said bellows responsive to the position of said sucker rod,
(m) thus pumping said well,
(n) a second bellows connected between the base plate and top plate,
(o) a confined volume of gas within said second bellows,
(p) under sufficient pressure so that the stress exerted by the second bellows upon the top plate approaches the dead weight of the sucker rod.

7. The invention as defined in claim 6 wherein
(q) the first named bellows are fluidly connected with the reservoir, thus
(r) the fluid within the reservoir is the oil pumped from the well, and
(s) the means for pressurizing is a pump.

8. The invention as defined in claim 6 with the addition of
(q) valve means interconnecting said first and second bellows for connecting said second bellows to the first bellows only.

9. The invention as defined in claim 8 with the addition of
(r) the reservoir is fluidly connected with the tubing, thus
(s) the fluid within the reservoir is the oil pumped from the well, and
(t) the means for pressurizing is a pump, and
(u) a check valve connected between the first named and second bellows to ensure that the pressure in the first named bellows is always as much as in the second bellows, and
(v) a check valve connected from the space outside the second bellows to the space inside the second bellows to ensure that the pressure in the bellows is always as much as outside the bellows.

10. The invention as defined in claim 9 wherein
(w) the second bellows surrounds the first named bellows.

11. The invention as defined in claim 8 with the addition of
(r) the fluid within the reservoir is air and
(s) the means for pressurizing is an air compressor and
(t) a check valve connected between the first named and second bellows to ensure that the pressure in the first named bellows is always as much as in the second bellows, and
(u) a check valve connected from the space outside the second bellows to the space inside the second bellows to ensure that the pressure in the bellows is always as much as outside the bellows.

12. The invention as defined in claim 11 wherein
(v) the second bellows surrounds the first named bellows.

13. A bellows comprising
(a) an impervious base plate,
(b) an impervious top plate,
(c) a fluid inlet through the base plate,
(d) a series of bellows rings connecting the base plate and top plate,
(e) each ring being an annular, pliable, impervious fabric band with
(f) a rigid circular hoop attached at top and bottom,
(g) said hoops approximately the same diameter,
(h) the bottom of each ring telescoped over the top of the next adjacent ring,
(j) so that the top of the fabric is pressed by the internal pressure in the bellows against the bottom hoop to form a fluid tight seal.

14. The invention as defined in claim 13 wherein each bellows ring is keg-shaped, i.e., of larger diameter in the center than each end.

References Cited
UNITED STATES PATENTS

| | | | |
|---|---|---|---|
| 1,010,123 | 11/1911 | Deegan | 92—45 X |
| 2,665,551 | 1/1954 | Chenault. | |
| 3,303,750 | 2/1967 | Powell. | |

ROBERT M. WALKER, *Primary Examiner.*